Figure 1:
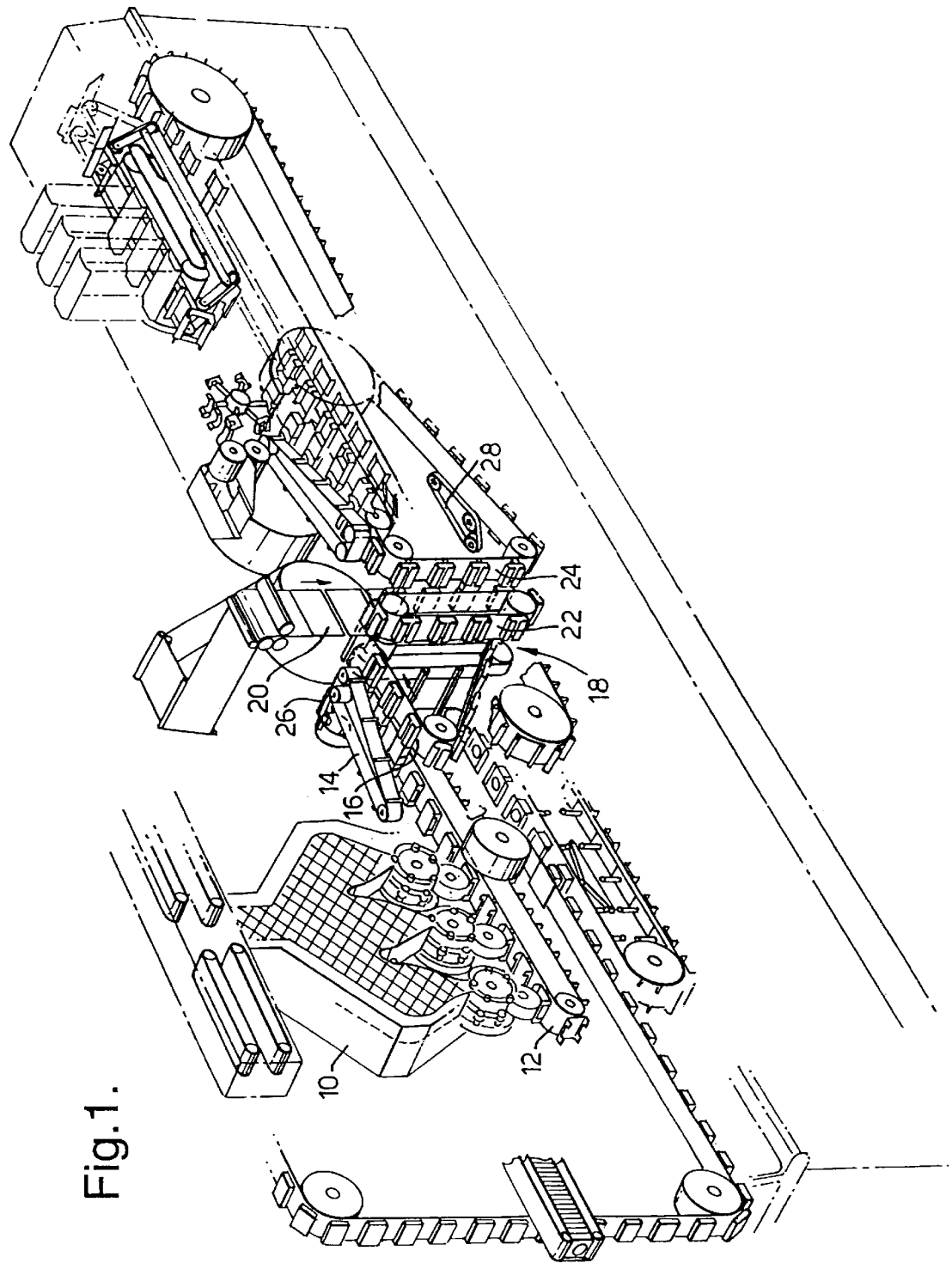

United States Patent
Bailey et al.

[19]

[11] Patent Number: 5,996,310
[45] Date of Patent: Dec. 7, 1999

[54] PACKAGING APPARATUS

[75] Inventors: Thomas William Bailey; Michael John Cahill, both of Coventry; Robert Howard Taylor, Bucks, all of United Kingdom

[73] Assignee: Molins PLC, Milton Keynes, United Kingdom

[21] Appl. No.: 09/011,381

[22] PCT Filed: Jul. 15, 1996

[86] PCT No.: PCT/GB96/01691

§ 371 Date: Jan. 14, 1998

§ 102(e) Date: Jan. 14, 1998

[87] PCT Pub. No.: WO97/03878

PCT Pub. Date: Feb. 6, 1997

[30] Foreign Application Priority Data

Jul. 14, 1995 [GB] United Kingdom ............... 9514453

[51] Int. Cl.⁶ .................................................. B65B 11/06
[52] U.S. Cl. ................................ 53/228; 53/176; 53/234
[58] Field of Search ............................. 53/397, 410, 415, 53/135.1, 136.1, 579, 580, 176, 209, 228, 234, 389.4

[56] References Cited

U.S. PATENT DOCUMENTS 4,559,758  12/1985  Gamberini .................................. 53/234
5,163,268  11/1992  Vaccari et al. ............................. 53/234
5,216,869  6/1993   Boldrini et al. ........................... 53/234
5,544,467  8/1996   Focke ......................................... 53/234
5,657,609  8/1997   Spada et al. ............................. 53/135.1

FOREIGN PATENT DOCUMENTS 0 553 636 A1  8/1993  European Pat. Off. .
2 220 910     1/1990  United Kingdom .

Primary Examiner—Joseph J. Hail, III
Assistant Examiner—Ed Tolan
Attorney, Agent, or Firm—Antonelli, Terry, Stout & Kraus, LLP

[57] ABSTRACT

In a packaging machine, particularly for producing hingedlid packets for cigarettes conveyed on an endless pocket conveyor (16) become partially wrapped in a wrapper section (20) during transfer to a further endless pocketed conveyor (24). In passing to the further conveyor the groups and wrapper sections pass through a forming member carried on an intermediate endless conveyor (22). Transfer of the groups is effected by cam-operated plunger units (26A) carried by a fourth endless conveyor (26). The machine further includes a packet transfer unit at which spaced packets are deposited on a suction belt (50) prior to delivery in abutment to a packet reservoir (54); and a blank feed unit (30) comprising a continuously moving endless feed conveyor (62) provided with reciprocating pulleys, the movement of which causes the conveyor to remain stationary to allow transfer of blanks from a stationary reservoir (60).

9 Claims, 8 Drawing Sheets

PACKAGING APPARATUS

This invention relates to packaging apparatus, particularly for packaging articles such as cigarettes in hinged-lid packets. The apparatus is particularly, but not exclusively, applicable to so-called continuous packing machines, where the product is moved continuously through the apparatus while undergoing process operations. This is in contrast to conventional apparatus where the product is moved intermittently and often undergoes process operations while stationary.

According to one aspect of the invention packaging apparatus comprises first conveyor means having spaced means for conveying articles along a first path, second conveyor means having spaced means for conveying partially wrapped articles along a parallel second path, means for feeding wrapper sections along a further parallel path lying between said first and second paths, third conveyor means carrying means for transferring articles from said first path to said second path and for simultaneously plunging the articles against a wrapper section on said further path so that the articles become partially wrapped in said wrapper sections, further comprising fourth conveyor means carrying spaced forming means along an intermediate path lying between said further path and said second path, so that each of said articles and wrapper sections pass through one of said forming means in passing to said second path. The first, second, third and fourth conveyor means may each comprise endless band conveyors. Alternatively, two or more (including all) of the first, second, third and fourth conveyor means may have paths on or be carried by common conveyor means, e.g. a drum. In either case the paths of the respective conveyor means preferably include parallel portions. The spaced means of said first and second conveyor means may each comprise pockets, and the spaced forming means of said fourth conveyor means may comprise a sleeve-like element. The third conveyor means may comprise plunger means and may be so disposed relative to the other conveyors that the plungers are progressively moved from the region of said first path to the region of said second path as they are moved by said conveyor. To achieve this, the third conveyor preferably includes cam means for causing progressive extension of the plungers through the spaced means of said first and fourth conveyor means.

The articles may comprise batches of cigarettes for packing, and the wrapper sections may comprise foil in which the batches are to be wrapped prior to packaging in hinged lid packets. The forming means serves to form and align the wrapper section prior to receipt by the spaced means (e.g. pockets) of the second conveyor means, particularly those parts of the wrapper sections which remain to be folded downstream of the apparatus.

Where the articles are rectangular in cross-section, as in the case of a batch of cigarettes to be packed in a hinged-lid pack, the articles are preferably moved along said first and second paths in a direction parallel to their wider side: this can allow relatively close spacing of laterally-spaced wrapper section feeding means while still allowing access for the transferring means.

According to another aspect of the invention packaging apparatus comprises first conveyor means having spaced carriers for packets, second conveyor means for receiving packets from said first conveyor means and for delivering them to stack forming means, and transfer means for effecting transfer of packets from said first to said second conveyor means, wherein said second conveyor means comprises endless band means for receiving packets from said transfer means at a first spacing and for delivering them to said stack forming means at second spacing. In a preferred arrangement the second conveyor means comprises a suction band on which the packets can slip relative to the band and thereby change their spacing. The stack forming means may comprise a stop against which the suction band delivers packets and from which removal means (e.g. a plunger) directs the packets into a stack reservoir. The transfer means may take the form of an endless conveyor disposed at an angle to said first and second conveyors and carrying pushers which move together with the carriers of the first conveyor means and progressively eject the packets from the carriers and onto the second conveyor means.

The first conveyor means may be arranged at the downstream end of a packaging machine and be part of a form stabilising region for the newly-completed packets: line stack forming means may deliver packets in abutment into a packet reservoir in which the packets are stacked and further stabilised before delivery to downstream apparatus.

According to a further aspect of the invention packaging apparatus for feeding packaging blanks from a blank reservoir to a packaging conveyor moving at a predetermined speed, comprises an endless blank conveyor having means for receiving blanks from the reservoir, means for driving the blank conveyor at said predetermined speed, and means for periodically imposing an opposite speed on said conveyor in the region of said reservoir without affecting its speed in the region of said packaging conveyor, whereby the receiving means are substantially stationary during transfer of a blank from the reservoir and have a speed substantially matched to that of the packaging conveyor during transfer of the blank to said packaging conveyor.

In a preferred arrangement the packaging conveyor passes around at least four pulleys, so as to define a first run which lies adjacent to the blank reservoir and an opposed second run which lies adjacent to the packaging conveyor, the pulleys in said first run being carried by pivotable links which can be reciprocated to impose the speed variation in the region of the blank reservoir. Preferably the reservoir comprises a blank stack, and suction means (e.g. a plunger) is provided for withdrawing a blank from the reservoir onto the endless conveyor. The means for receiving blanks on the conveyor may comprise a series of spaced pockets. Means for transferring blanks from the endless conveyor to the packaging conveyor may comprise a cam-operated ejecting plunger. The blanks may be received on the packaging conveyor in pockets which cooperate with the ejecting plunger to partially fold the blank on receipt. There may be a plurality of blank reservoirs from which blanks are simultaneously withdrawn.

In all aspects of the invention it should be understood that the respective conveyor means may be continuously driven.

Figure 2:
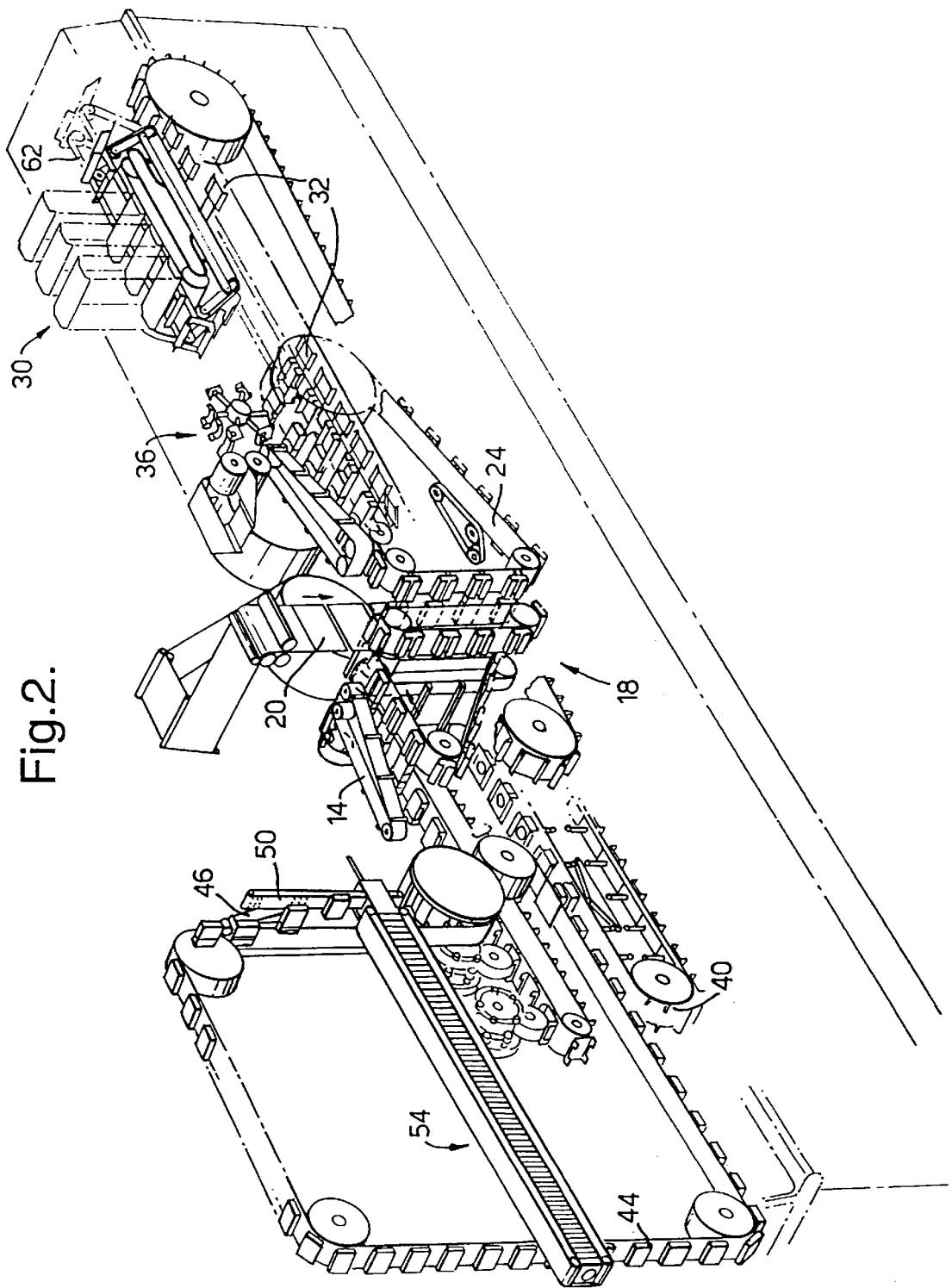
Figure 3:
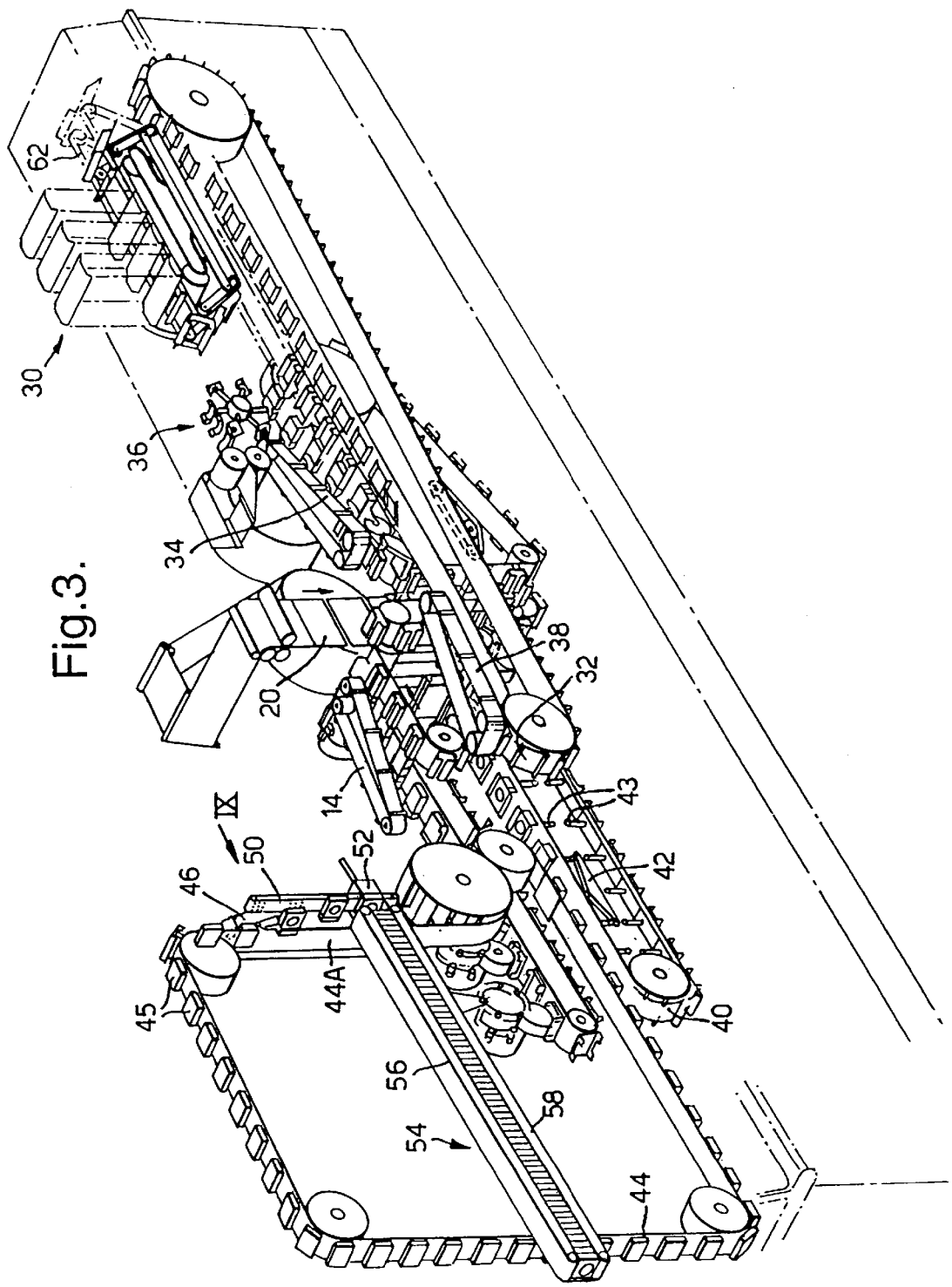
Figure 4:
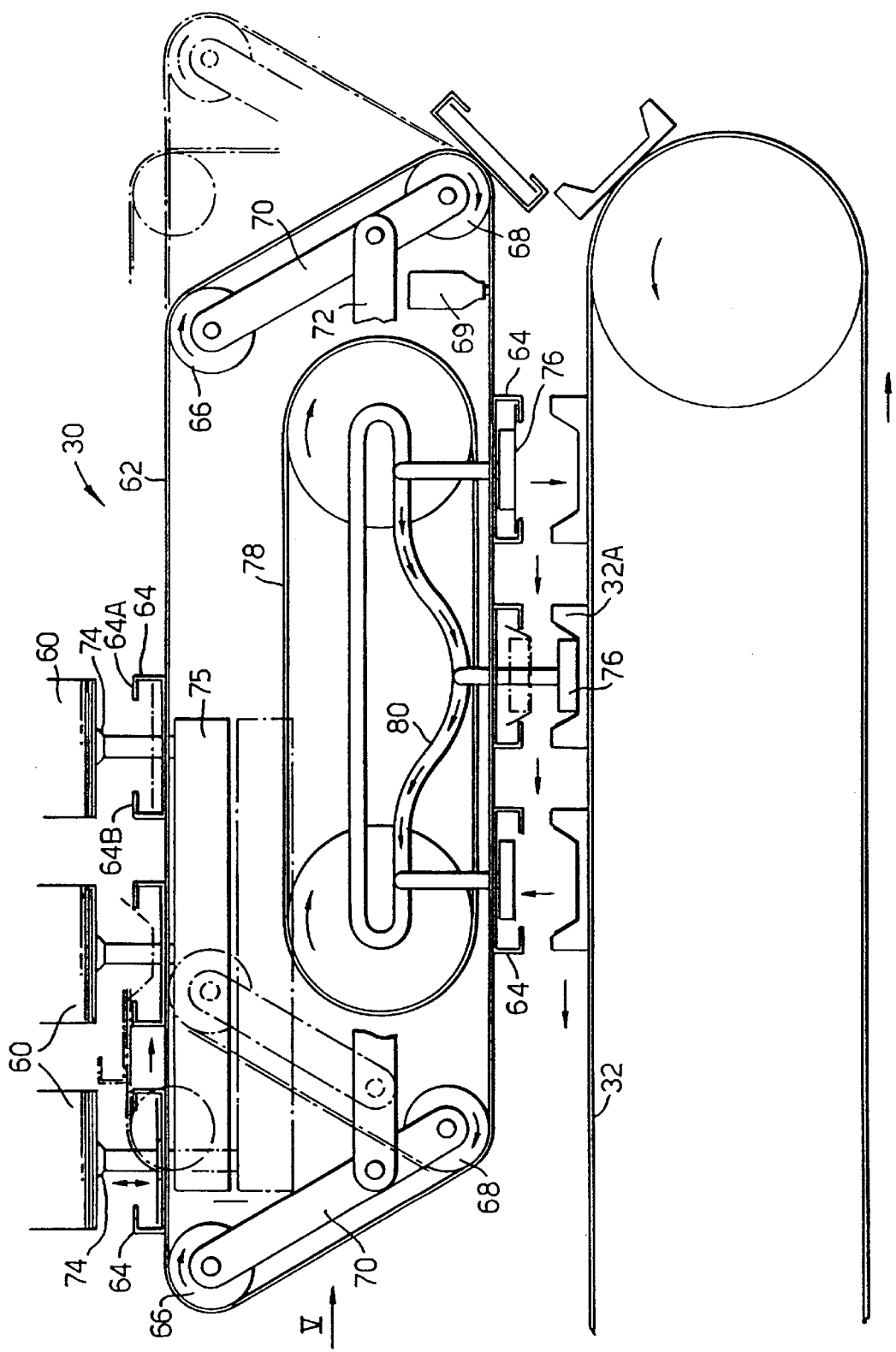
Figure 5:
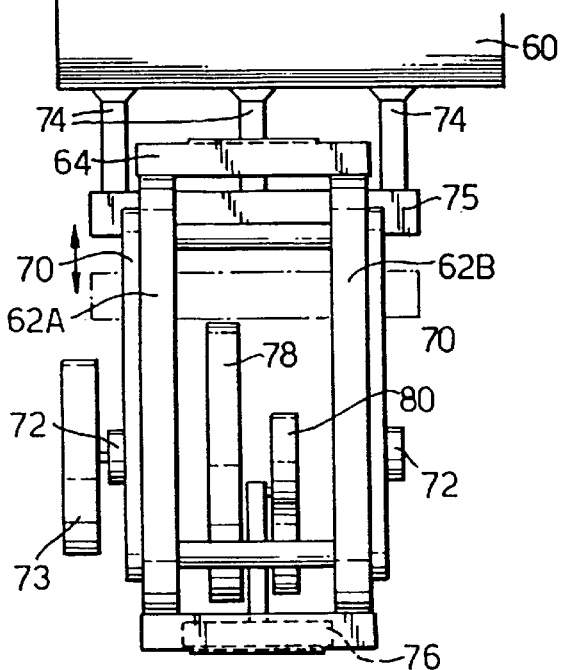
Figure 5:
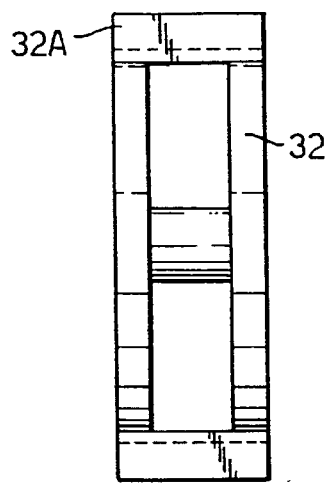
Figure 6:
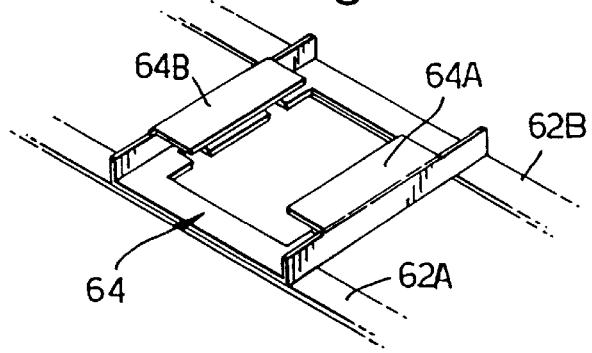
Figure 7:
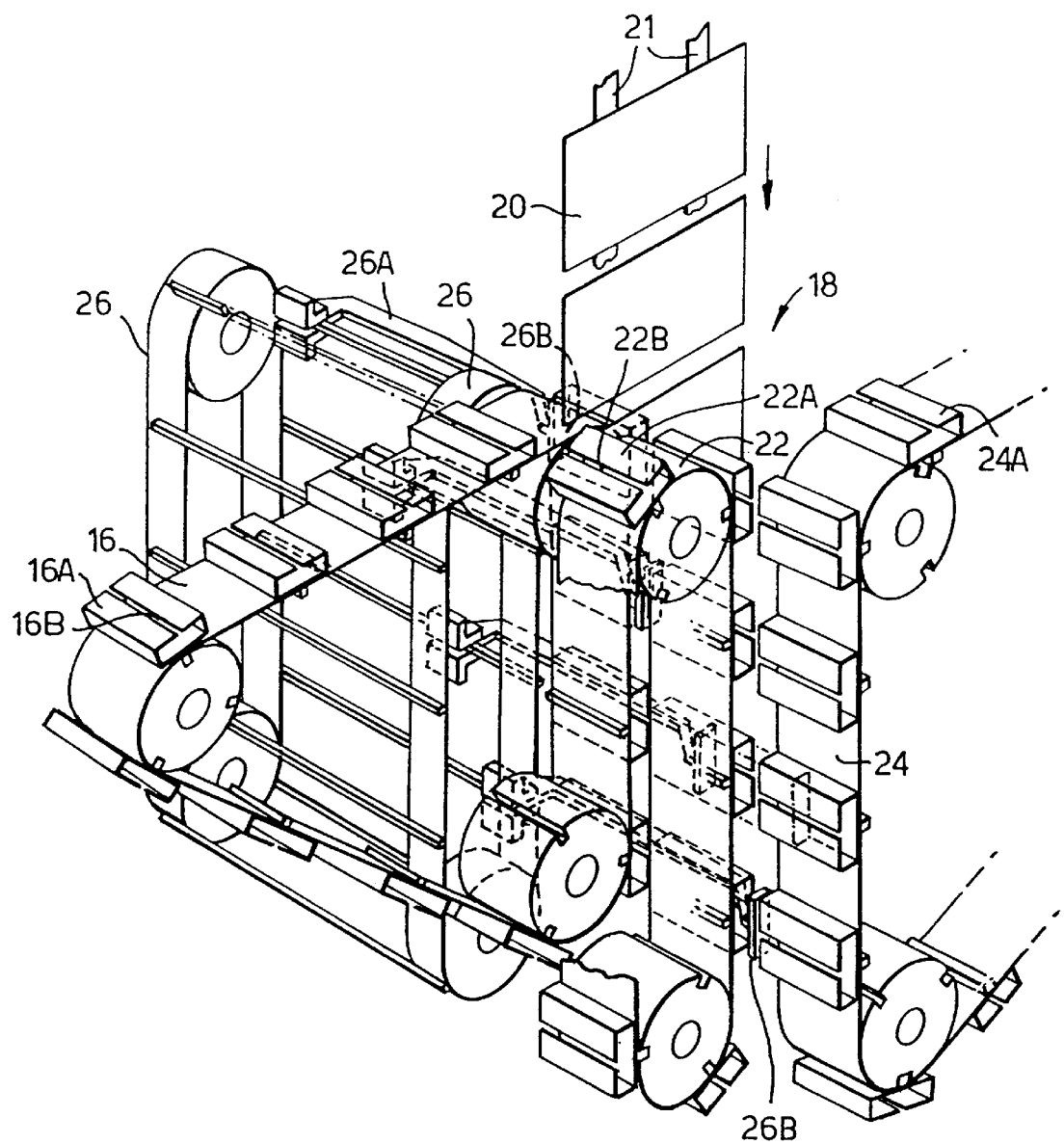
Figure 8:
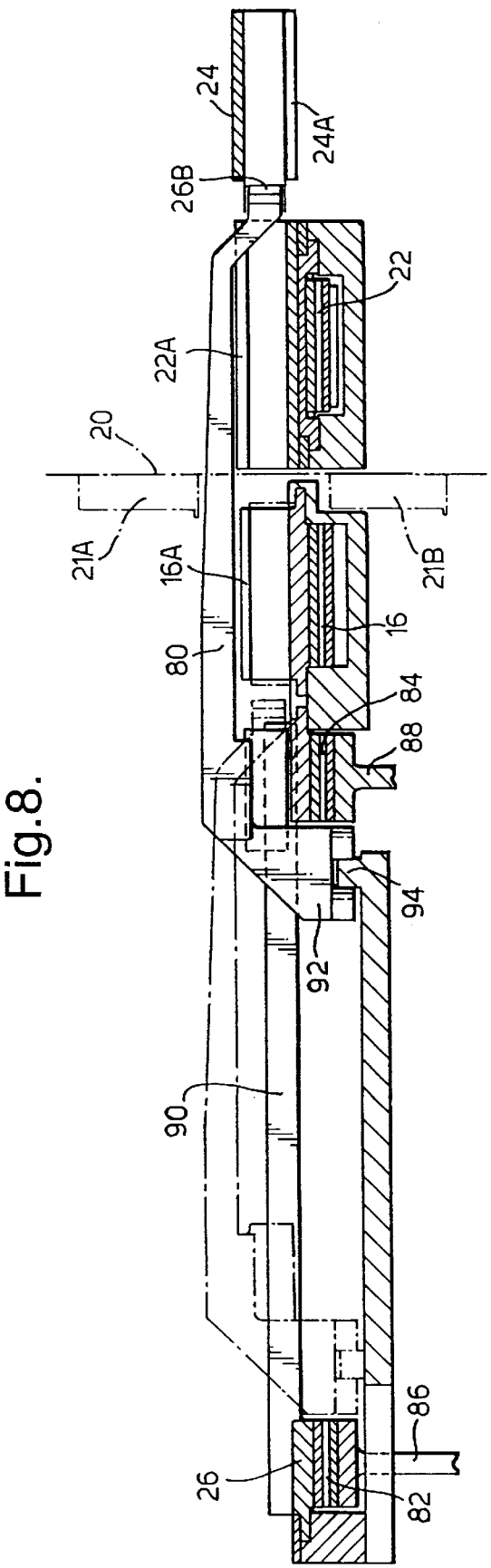
Figure 9:
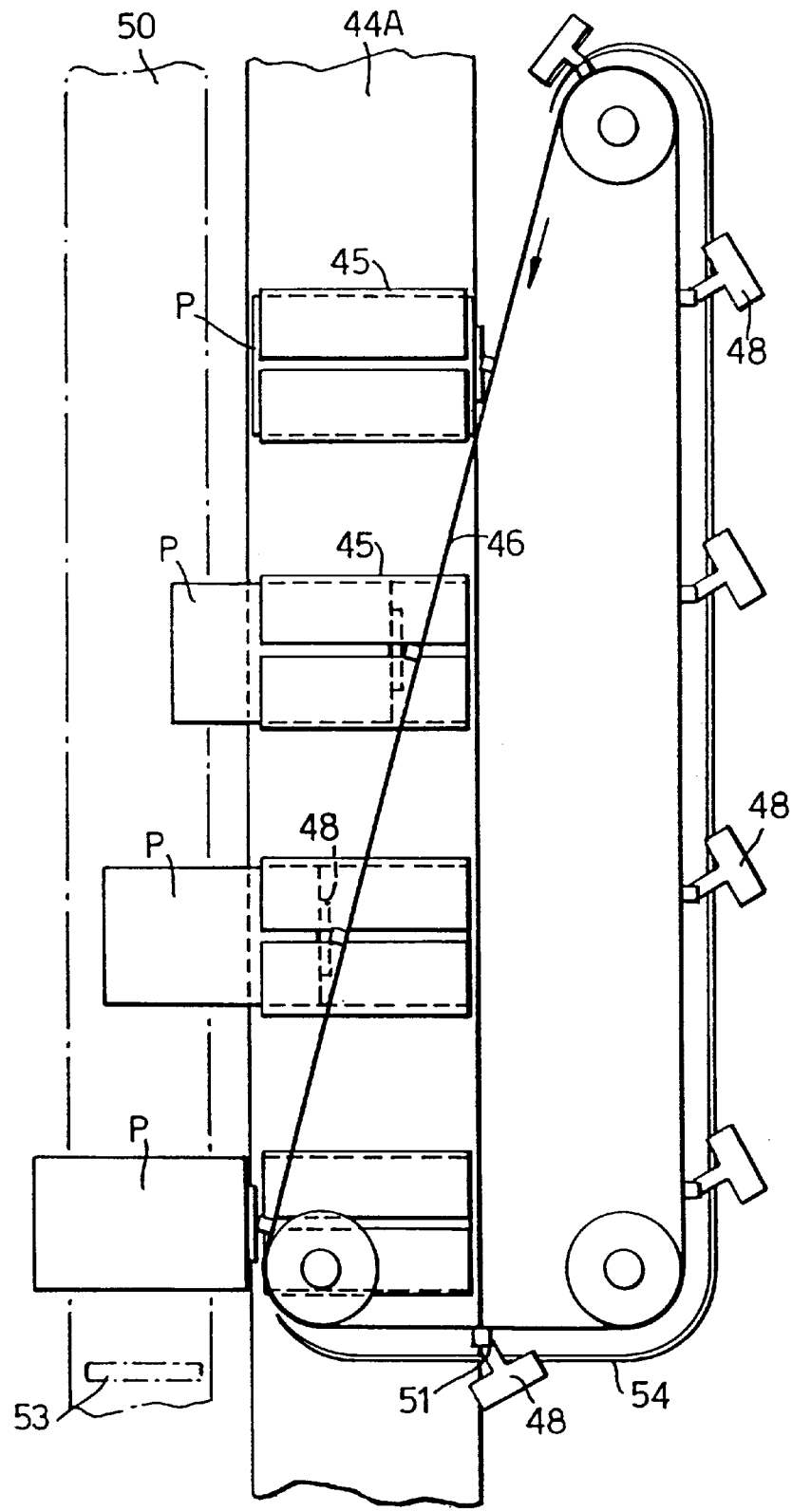

The invention will be further described, by way of example only, with reference to the accompanying diagrammatic drawings, in which:

FIG. 1 is a perspective view of a cigarette packing machine, with certain parts of the structure removed to show underlying detail, FIG. 2 is a view, similar to that of FIG. 1, showing part of the structure removed in FIG. 1, FIG. 3 is a view similar to that of FIG. 2, showing a further part of the structure removed in FIG. 1, FIG. 4 is a side view of part of a blank feed unit in the machine of FIG. 1, FIG. 5 is an end view in the direction of arrow V in FIG. 4, FIG. 6 is a perspective view of a blank carrier of the unit of FIG. 4, FIG. 7 is a perspective view of a foil wrapping unit in the machine of FIG. 1, FIG. 8 is a sectional view on the line VIII—VIII in FIG. 7, and FIG. 9 is a view in the direction of arrow IX in FIG. 3.

The machine shown in FIGS. 1–3 is for packaging batches of cigarettes in hinged lid packets. Cigarettes are delivered to a hopper 10, from which batches commonly comprising 20 cigarettes are transferred to a continuously-moving pocketed conveyor 12. The hopper 10 and its operation are substantially as disclosed in British patent specification No. 2290514A or in PCT patent specification No. WO95/21771. An angled plunger conveyor 14 transfers the batches of cigarettes to a further pocketed conveyor 16 having a vertical run through a foil wrapping unit 18.

In the unit 18 foil wrapper sections 20 are delivered by laterally spaced bands 21 (FIG. 7) along a vertical path between the conveyor 16 and an intermediate conveyor 22 carrying sleeve-like pockets 22A (FIG. 7). Beyond the intermediate conveyor 22 is a further pocketed conveyor 24. The unit 18 further comprises a plunger conveyor 26, the arrangement being such that the plungers carried by the plunger conveyor eject batches of cigarettes from the pocketed conveyor 16 so that each batch becomes wrapped in a wrapper section and passes completely through a pocket 22A on the conveyor 22 so as to be received in a pocket of the conveyor 24. It will be understood that the conveyors 16,22 and 24, as well as the sections 20, all move continuously at the same speed during this process in the unit 18.

Wrapping of the batches of cigarettes in the foil wrapper sections is completed during further passage on the conveyor 24, by means of a tucker conveyor 28.

A blank feed unit 30 supplies precreased packet blanks to a further pocketed conveyor 32 on which initial folding of the blanks occurs. As best seen in FIG. 3, the conveyor 32 lies in front of the conveyor 24, so that an angled transfer conveyor 34 can push the wrapped batches of cigarettes from the conveyor 24 onto the blanks in the pockets of the conveyor 32. Just prior to transfer of the batches a rotary unit 36 places individual packet inner frames on each wrapped batch.

As again best seen in FIG. 3, folding of the packet blanks around the wrapped batch of cigarettes and inner frame is continued on the conveyor 32 up to a position at which the partially completed packs are transferred by a further angled conveyor 38 onto another pocketed conveyor 40. A cam 42 cooperates with a plunger 43 in each of the pockets of the conveyor 40 to cause the packets to be transferred upwards into a pocket 45 of yet another pocketed conveyor 44 having a run extending parallel to and above the conveyor 40. During the upward transfer the side flaps of the packet are folded down, thus completing the formation of the packet. It will be understood that during the course of the process adhesive will have been applied and/or activated to appropriate parts of the blank (e.g. by a glue gun 69 as shown in FIG. 4).

Referring to FIGS. 3 and 9, the conveyor 44 conveys the packets on an extended path, during which they are maintained firmly in shape by the pockets of the conveyor, and the adhesive dries or sets. The conveyor 44 includes a vertical run 44A along which an angled band 46 carrying transfer plungers 48 causes packets to be ejected from the pockets on the conveyor 44 and to be received on a vertical suction band 50. Successive packets received on the suction band 50 are delivered downwards into the path of a reciprocating horizontal plunger 52 which causes the packets to be transferred into a horizontal reservoir 54 between upper and lower bands 56,58. The suction band 50 slips relative to the packet after it has been deposited against a stop 53 in the path of the plunger 52, which is in the form of a yoke having laterally spaced portions which engage the packet on each side of the band 50.

As shown in FIG. 9, each pusher 48 is attached to the band 56 by means of a connecting block 49 by way of a one-way hinged connection about an axis 51. The arrangement is such that each pusher 48 is biased by spring means (not shown) into a position in which it extends transversely of the band 46 during an operative run of the band along which the pusher acts to eject packets P from the respective pocket 45 on the run 44A of conveyor 44. It will be appreciated that the speed of the band 46 is such that its component in the direction of conveyor run 44A is the same as the speed of the conveyor 44. Once a pusher has passed through a pocket 45 a depending part of the pusher is engaged by a stationary cam rail 54 which causes the pusher to pivot about its hinge axis 51 so that it assumes an attitude wherein the pusher does not extend laterally of the band 46: this allows it to clear the pocket 45 on the return run of the band 46. The rail 54 ends upstream of the position at which the pushers 48 are again required to assume laterally extended positions so as to engage packets P in the pockets 45. The spring mounting of the pushers 48 ensures that once released by the rail 54 the pushers assume their extended (operative) positions.

Referring now to FIGS. 4–6, the blank feed unit 30 is shown in more detail. Blanks are received from a supply (not shown) and maintained in three stacks 60. An endless band 62 carrying regularly spaced pockets 64 has an upper run which passes below the stacks 60 and a lower run which is parallel to the upper run of the conveyor 32. The spacing of the pockets 64 is the same as that of the pockets 32A on the conveyor 32. The conveyor 62 is driven at the same speed as the conveyor 32, with the pockets 32A and 64 in alignment as shown in FIG. 4.

The conveyor 62 passes around upper pulleys 66 and lower pulleys 68, the upper pulleys 66 being carried by links 70 which are respectively pivoted about the centres of the lower pulleys 68, and which are connected by a common drive link 72. The link 72 is driven by means of a drive cam 73 (FIG. 5) so that the links 70 are reciprocated by pivotal movement extending over an angle of about 60° as indicated in FIG. 4. During movement to the left as shown in FIG. 4 the velocity imposed by the links 70 on the upper run of the belt 62 is equal and opposite to that of the velocity of the belt around the pulleys 66,68, so that for a short period the pockets 64 are stationary beneath the stacks 60. During this period suction cups 74 operate to cause the lowermost blank to be withdrawn from the respective reservoir 60 and placed in the pocket below. As shown in FIG. 6, each pocket 64 is supported on laterally spaced sections 62A,62B of the belt 62 and has an open central area allowing the suction cups 74 to access the blanks. The suction cups 74 and an associated suction manifold 75 are moved up and down to withdraw blanks and deposit them in the pockets 64 by a drive which is synchronised with the drive cam 73. The pockets 64 also have inwardly directed portions 64A,64B which serve to retain the blanks in the pockets 64. The suction cups 74 are capable of pulling the blanks past these inwardly directed portions 64A,64B during insertion of the blank into the pocket 64. Ejecting plungers 76 carried by a belt 78 and extendible by means of a cam track 80 cause the blanks to be transferred from the pockets 64 during their passage along the lower run of the belt 62. The plungers 76 cause the blanks to be partially folded as they are received in the pockets 32A, as shown in FIG. 4.

FIGS. 7 and 8 show more details of the foil wrapper unit 18. The conveyor 16 has pockets 16A which carry batches of cigarettes received from the conveyor 12. The conveyor 22 carries rectangular sleeves 22A The conveyor 24 carries pockets 24A for receiving the partially wrapped batches of cigarettes. Each of the conveyors 16,22,24 and 26 have vertical runs which are in alignment with each other, and with a central vertical line passing through the path of the foil wrapper sections 20. The plunger conveyor 46 carries a series of plunger units 26A, which are spaced by the same distance as the respective pockets 16A and 24A, and each of which has an extendible plunger 26B which is movable through a pocket 16A and sleeve 22A so as to plunge a batch of cigarettes out of a pocket 16A and through a foil section 20 causing it to become folded as it moves through the sleeve and subsequently to be received in a pocket 24A. The plunger 26B is shown in its extended position in full lines and in its retracted position in chain doted lines in FIG. 8. The sleeves 22A assist in forming that part of the wrapper section which remains to be folded after the partially wrapped batch has been received in the pocket 24A, because all of the wrapper section 20 (including that part which does not enter the pocket 24A) has passed through the sleeve 22A.

Each plunger 26B is disposed at an outer end of a cranked support arm 80 which is of narrow section so that it can pass through a slot 16B or 22B in the respective pocket 16A or sleeve 22A The inner end of the arm 80 is supported by and movable on a slide 90 which extends between laterally spaced belts 82,84 passing around end pulleys 86,88. At its inner end each support arm 80 has a box cam 92 engaged with a cam rail 94 formed in a stationary plate disposed adjacent the path of the slide 90. The arrangement is such that the extension of the plunger unit 26A is determined by the engagement of the box cam 92 with the cam rail 94 as the unit is conveyed along the path of conveyor 26. The shape of the cranked arm 80 allows the path of the conveyor 16 to diverge from that of the conveyor 26 with the plunger 26B in an extended position. Note that the paths of the conveyors 26 and 22 are parallel so that retraction of the plunger 26B through the respective pocket 22A is possible.

The path of the wrapper sections 20 and the positions of suction manifolds 21A,21B for laterally spaced bands 21 for the wrapper sections is indicated in FIG. 8, between the conveyors 16 and 22.

Movement of the batch in a direction parallel to its widest side allows the spacing between the laterally spaced bands 21 which convey the wrapper section through the unit 18 to be relatively narrow, thereby increasing the control on the sections up to the point at which the batches of cigarettes are plunged against them.

We claim:

1. Apparatus for wrapping groups of rod-like articles, each in a flexible wrapping section, comprising first conveyor means carrying spaced means for conveying groups of articles along a first path, second conveyor means carrying spaced means for conveying partially wrapped groups of articles along a second path parallel to said first path, means for feeding wrapper sections along a further path parallel to said first and second paths and lying between said first and second paths, and means for transferring successive groups of articles from said first path to said second path so that each group intercepts a wrapper section on said further path and becomes partially wrapped in the wrapper section, wherein the transferring means is carried by third conveyor means movable with said first and second conveyor means, and wherein fourth conveyor means carrying spaced forming means is provided along an intermediate path lying between said further path and said second path, so that each of said groups of articles and wrapper sections passes through one of said forming means in passing to said second path, said forming means being arranged to form said wrapper sections around said groups of articles.

2. Apparatus as claimed in claim 1, wherein each of said first, second, third and fourth conveyor means comprise endless band conveyors.

3. Apparatus as claimed in claim 1, wherein the spaced means of said first and second conveyor means comprise pockets for supporting said groups of articles.

4. Apparatus as claimed in claim 3, wherein the spaced forming means of said fourth conveyor means comprises a sleeve-like element.

5. Apparatus as claimed in claim 1, wherein the third conveyor means carries plungers for transferring said groups of articles from said first path to said second path.

6. Apparatus as claimed in claim 5, including cam means for causing progressive extension of said plungers to effect said transfer of groups of articles from said first path to said second path as said plungers are moved by said third conveyor means.

7. Apparatus as claimed in claim 1, wherein said groups of articles are rectangular in cross-section and are moved along said first and second paths in a direction parallel to their wider sides.

8. Apparatus as claimed in claim 1, wherein said transferring means is continuously conveyed by said third conveyor means in a direction parallel to said first and second paths while transferring a group of articles between said first and second paths.

9. Apparatus as claimed in claim 8, wherein said transferring means includes at least one plunger, and said forming means includes at least one element into which said plunger is inserted during transfer of a group of articles between said first and second paths.

* * * * *